US011458445B2

(12) United States Patent
Asami et al.

(10) Patent No.: US 11,458,445 B2
(45) Date of Patent: Oct. 4, 2022

(54) NANOPARTICLE SYNTHESIS APPARATUS

(71) Applicants: NIHON SPINDLE MANUFACTURING CO., LTD., Hyogo (JP); UNIVERSITY OF HYOGO, Hyogo (JP)

(72) Inventors: Keiichi Asami, Hyogo (JP); Keiichiro Onishi, Hyogo (JP); Yoshihiro Oka, Hyogo (JP)

(73) Assignees: NIHON SPINDLE MANUFACTURING CO., LTD., Hyogo (JP); UNIVERSITY OF HYOGO, Hyogo (JP)

( * ) Notice: Subject to any disclaimer, the term of this patent is extended or adjusted under 35 U.S.C. 154(b) by 245 days.

(21) Appl. No.: 15/634,371

(22) Filed: Jun. 27, 2017

(65) Prior Publication Data

US 2018/0050317 A1 Feb. 22, 2018

(30) Foreign Application Priority Data

Aug. 22, 2016 (JP) ............................ JP2016-162128

(51) Int. Cl.

| | |
|---|---|
| ***B01J 19/08*** | (2006.01) |
| ***B22F 9/04*** | (2006.01) |
| ***B22F 1/054*** | (2022.01) |
| ***B22F 9/14*** | (2006.01) |

(52) U.S. Cl.

CPC ............. *B01J 19/088* (2013.01); *B22F 1/054* (2022.01); *B22F 9/04* (2013.01); *B22F 9/14* (2013.01); *B01J 2219/0822* (2013.01); *B01J 2219/0841* (2013.01); *B01J 2219/0847* (2013.01);

(Continued)

(58) Field of Classification Search

CPC .............. B01J 19/088; B01J 2219/0822; B01J 2219/0841; B01J 2219/0847; B01J 2219/0884; B01J 2219/0896; B01J 19/1806; B01J 2219/0875; B01J 2219/0879; B01J 2219/0818; B01J 2219/0877; B22F 1/0018; B22F 9/04; B22F 9/14; B22F 2999/00; B22F 2009/045; B22F 3/003; B22F 2202/01; H01F 41/02; B02C 19/06; C25D 21/04; C25D 5/06;

(Continued)

(56) References Cited

U.S. PATENT DOCUMENTS

2004/0007539 A1* 1/2004 Denes .................. C02F 1/4608 210/748.18
2006/0050605 A1* 3/2006 Markhasin ............ B01F 3/0819 366/116

(Continued)

FOREIGN PATENT DOCUMENTS

JP 2012-167335 A 9/2012
JP 2016-020701 A 2/2016

*Primary Examiner* — Xiuyu Tai
(74) *Attorney, Agent, or Firm* — Michael Best & Friedrich LLP

(57) ABSTRACT

Nanoparticles are synthesized by suctioning a liquid under a negative pressure with a negative-pressure suction force caused by the rotation of a rotary blade, causing cavitation by stirring the suctioned liquid by the rotary blade, generating plasma generated by a plasma generation mechanism in air bubbles generated in the liquid, and in that case, consuming an electrode containing elements constituting the nanoparticles to be synthesized.

14 Claims, 10 Drawing Sheets

(52) U.S. Cl.
CPC *B01J 2219/0884* (2013.01); *B01J 2219/0896* (2013.01)

(58) Field of Classification Search
CPC .................. C02F 1/4608; C02F 1/4672; C02F 2001/46123; C02F 1/34; B01F 7/00875
See application file for complete search history.

(56) References Cited

U.S. PATENT DOCUMENTS

2006/0159561 A1* 7/2006 Tessien .................. B01J 19/008 417/313
2008/0214792 A1* 9/2008 Hultin ....................... A23J 1/02 530/412
2009/0071910 A1* 3/2009 Ike ........................ C02F 1/4608 210/748.19
2015/0122741 A1* 5/2015 Eckelberry ............ C12N 13/00 210/704
2015/0224577 A1* 8/2015 Celko ..................... H01F 41/02 75/347
2015/0239759 A1* 8/2015 Kang ........................ C02F 1/78 210/748.17
2016/0010716 A1 1/2016 Keida et al.
2017/0204707 A1* 7/2017 Clark .................... E21B 43/003

* cited by examiner

NANOPARTICLE SYNTHESIS APPARATUS

Priority is claimed to Japanese Patent Application No. 2016-162128, filed Aug. 22, 2016, the entire content of which is incorporated herein by reference.

BACKGROUND

Technical Field

A certain embodiment of the present invention relates to a nanoparticle synthesis apparatus, and relates to a nanoparticle synthesis apparatus made to synthesize nanoparticles in a liquid by generating plasma by the plasma generation mechanism.

Description of Related Art

In recent years, in various technical fields, such as catalysts, electronics, and chemistry, research of nanoparticles of metals or metal oxides has been made and been put to practical use.

Meanwhile, typical generation methods for nanoparticles are divided roughly into a gaseous phase method, a liquid phase method, and a solid phase method. The gaseous phase method includes a CVD method, a vapor phase synthesis method, an evaporation and condensation method by heating and evaporation of laser or arc, or the like. The liquid phase method includes a liquid phase reduction method, a chemical precipitation method, or the like. The solid phase method includes a solid phase synthesis method, a pulverizing method, or the like.

As methods other than these generation methods, a method of generating plasma by a plasma generation mechanism in a liquid, thereby synthesizing nanoparticles in the liquid, is suggested as the liquid phase method.

The related art discloses a nanoparticle generation method of disposing at least a pair of counter electrodes in a liquid of a solvent reaction unit that holds a solvent containing a metal-containing substance, and generating nanoparticles containing metals of the metal-containing substance with in-liquid intermittent plasma intermittently generated by repeatedly performing application and stop of high-voltage high-frequency pulses.

Additionally, the related art also discloses a method of producing tungsten oxide and metal tungsten microparticles using a pulse microwave in-liquid plasma device having a tungsten raw material as an electrode.

It is desirable to provide a nanoparticle synthesis apparatus that can simply synthesize nanoparticles with excellent energy efficiency in view of a method of generating plasma by a plasma generation mechanism in a liquid, thereby synthesizing the nanoparticles in the liquid.

SUMMARY

According to an embodiment of the present invention, there is provided a nanoparticle synthesis apparatus that generates plasma by a plasma generation mechanism in a liquid, thereby synthesizing nanoparticles in the liquid. The nanoparticle synthesis apparatus includes a suction stirring pump that suctions the liquid under a negative pressure with a negative-pressure suction force caused by the rotation of a rotary blade and stirs the suctioned liquid by the rotary blade, thereby causing cavitation; and a plasma generation mechanism that generates plasma in air bubbles generated in the liquid by the cavitation. Elements constituting the nanoparticles to be synthesized are contained in an electrode of the plasma generation mechanism.

According to another embodiment of the present invention, there is provided a nanoparticle synthesis apparatus of a second invention is a nanoparticle synthesis apparatus that generates plasma by a plasma generation mechanism in a liquid, thereby synthesizing nanoparticles in the liquid. The nanoparticle synthesis apparatus includes a flow speed application mechanism that applies a flow speed to the liquid; an obstacle that is installed in a flow passage for the liquid having the flow speed applied thereto by the flow speed application mechanism, thereby causing cavitation in the liquid having the flow speed applied thereto; and a plasma generation mechanism that generates plasma in air bubbles generated in the liquid by the cavitation. Elements constituting the nanoparticles to be synthesized are contained in an electrode of the plasma generation mechanism.

BRIEF DESCRIPTION OF THE DRAWINGS

FIG. 1A is a schematic block diagram, and FIG. 1B is an explanatory view of a plasma generation mechanism.

FIG. 7A is a longitudinal sectional view, and FIG. 7B is a cross-sectional view as seen from a downstream side.

DETAILED DESCRIPTION

Figure 1B:
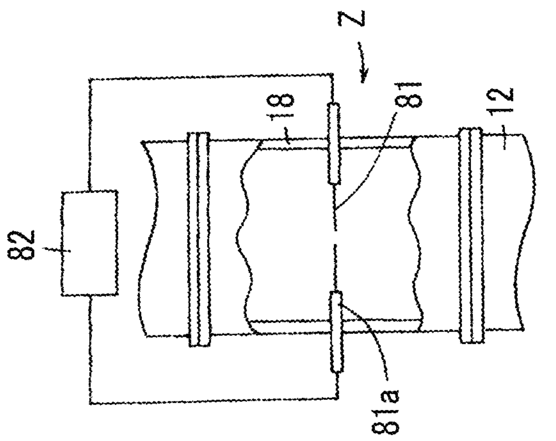
FIGS. 1A and 1B illustrate a nanoparticle synthesis apparatus an embodiment of the invention.

Meanwhile, both the above methods of generating the plasma by the plasma generation mechanism in the liquid, thereby synthesizing the nanoparticles in the liquid, are methods of applying high-voltage high-frequency pulses and pulse microwaves to boil water, and generating the plasma in the generated air bubbles, and have drawbacks in which energy efficiency is bad and the synthesis of the nanoparticles requires considerable time and energy.

The suction stirring pump may include a throttle flow passage through which the liquid having a flow speed applied thereto by being stirred by the rotary blade is passed.

Additionally, the plasma generation mechanism may be provided in a discharge pipe that is connected to the suction stirring pump and allows the liquid to be discharged therefrom.

The obstacle may be constituted of an electrode of the plasma generation mechanism.

The obstacle may be constituted of an obstacle installed on an upstream side of the electrode of the plasma generation mechanism.

A form of discharge caused by the plasma generation mechanism may be glow discharge.

According to the nanoparticle synthesis apparatus of the aspect of the invention, the nanoparticles can be simply synthesized with excellent energy efficiency by suctioning the liquid under a negative pressure with a negative-pressure suction force caused by the rotation of the rotary blade, stirring the suctioned liquid by the rotary blade, thereby causing the cavitation, generating the plasma by the plasma generation mechanism in the air bubbles generated in the liquid, and consuming the electrode containing the elements constituting the nanoparticles to be synthesized in that case.

Additionally, fine air bubbles caused by the cavitation can be efficiently generated in the liquid by passing the liquid, having the flow speed applied thereto by being stirred by the rotary blade, through the throttle flow passage.

Additionally, the plasma can be efficiently and uniformly generated by the plasma generation mechanism in the air bubbles generated in the liquid by the cavitation by providing the plasma generation mechanism in the discharge pipe that is connected to the suction stirring pump and allows the liquid to be discharged therefrom.

Additionally, according to the nanoparticle synthesis apparatus of the aspect of the invention, the nanoparticles can be simply synthesized with excellent energy efficiency by installing the obstacle in the flow passage for the liquid having the flow speed applied thereto, thereby causing the cavitation, generating the plasma by the plasma generation mechanism in the air bubbles generated in the liquid, and consuming the electrode containing the elements constituting the nanoparticles to be synthesized in that case.

Additionally, the fine air bubbles caused by the cavitation can be efficiently generated in the liquid by a simple mechanism by constituting the obstacle of the electrode of the plasma generation mechanism or constituting the obstacle of the obstacle installed on the upstream side of the electrode of the plasma generation mechanism.

The nanoparticles can be synthesized at a low temperature with excellent energy efficiency by using the glow discharge as the form of discharge caused by the plasma generation mechanism.

Hereinafter, nanoparticle synthesis apparatuses embodiments of the invention will be described.

[Outline of Method of Synthesizing Nanoparticles by Nanoparticle Synthesis Apparatus]

A method for synthesizing nanoparticles by the nanoparticle synthesis apparatus of the invention is the method of suctioning a liquid under a negative pressure with a negative-pressure suction force caused by the rotation of a rotary blade, stirring the suctioned liquid by the rotary blade, thereby causing cavitation, generating plasma by a plasma generation mechanism in air bubbles to generated in the liquid, and consuming electrodes containing elements constituting the nanoparticles to be synthesized in that case, thereby synthesizing nanoparticles simply and with high energy efficiency.

[Nanoparticle Synthesis Apparatus]

Hereinafter, an embodiment of the nanoparticle synthesis apparatus of the invention will be described with reference to FIGS. 1 to 6.

Figure 1A:
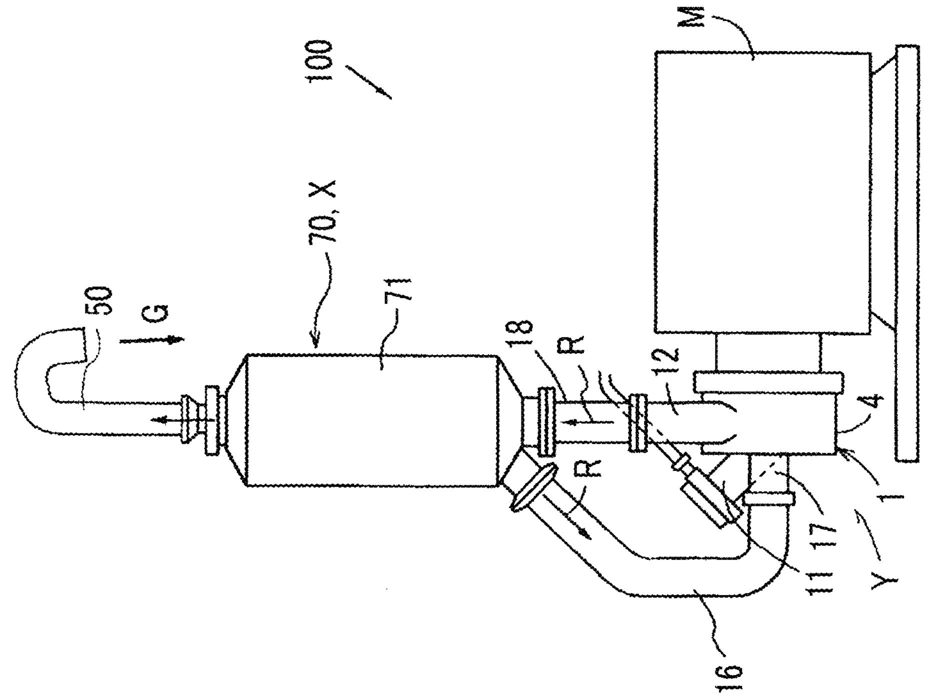

The outline of a nanoparticle synthesis apparatus 100 is illustrated in FIG. 1.

The nanoparticle synthesis apparatus 100, for example, is configured to include a liquid supply unit X that supplies a liquid R, such as water, a suction stirring pump Y that suctions the liquid R supplied from liquid supply unit X under a negative pressure to stir the liquid, a plasma generation mechanism Z that generates plasma in air bubbles generated in the liquid R discharged from the suction stirring pump Y by cavitation, and a recirculation mechanism unit 70 that circulates and supplies of at least a portion of the liquid R discharged from the suction stirring pump Y to the suction stirring pump Y, on a downstream side of the plasma generation mechanism Z.

[Liquid Supply Unit]

As illustrated in FIG. 1, in the present embodiment, the liquid supply unit X is configured to serve also as the recirculation mechanism unit 70, and is configured so as to supply the liquid R stored in a cylindrical container 71 serving as a storage tank to a second supply unit 17 of the suction stirring pump Y.

[Suction Stirring Pump]

The suction stirring pump Y will be described with reference to FIGS. 1 and 2 to 6.

Figure 2:
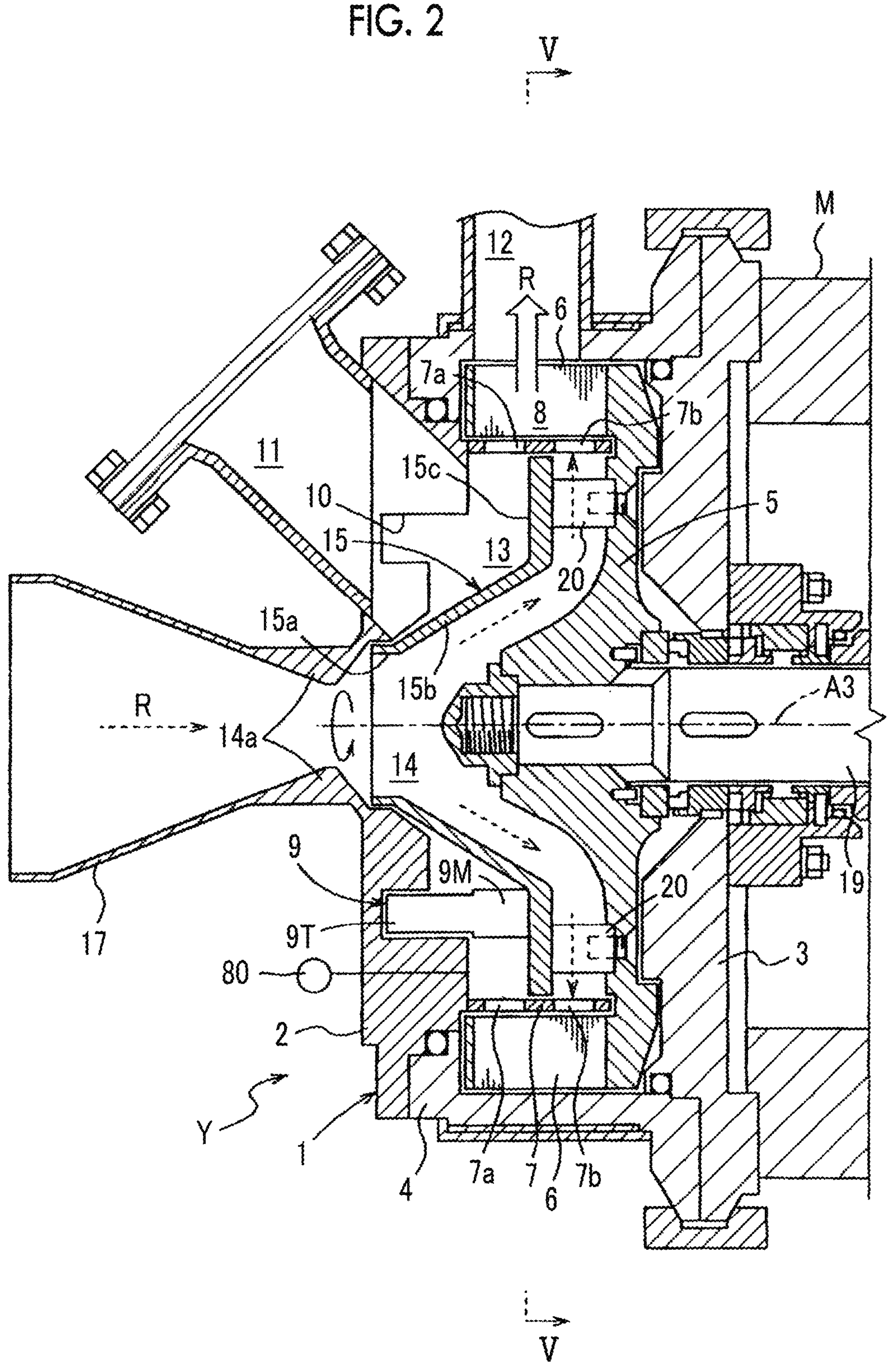
FIG. 2 is an explanatory view illustrating an internal structure of a suction stirring pump.

As illustrated in FIG. 2, the suction stirring pump Y is configured to include a casing 1 including a cylindrical outer peripheral wall part 4 of which both end openings are closed by a front wall part 2 and a rear wall part 3 and to include a rotor 5 that is concentrically provided in a rotationally drivable manner inside the casing 1, a cylindrical stator 7 that is concentrically fixed to and disposed at the front wall part 2 inside the casing 1, a pump drive motor M that rotationally drives the rotor 5, and the like.

Figure 3:
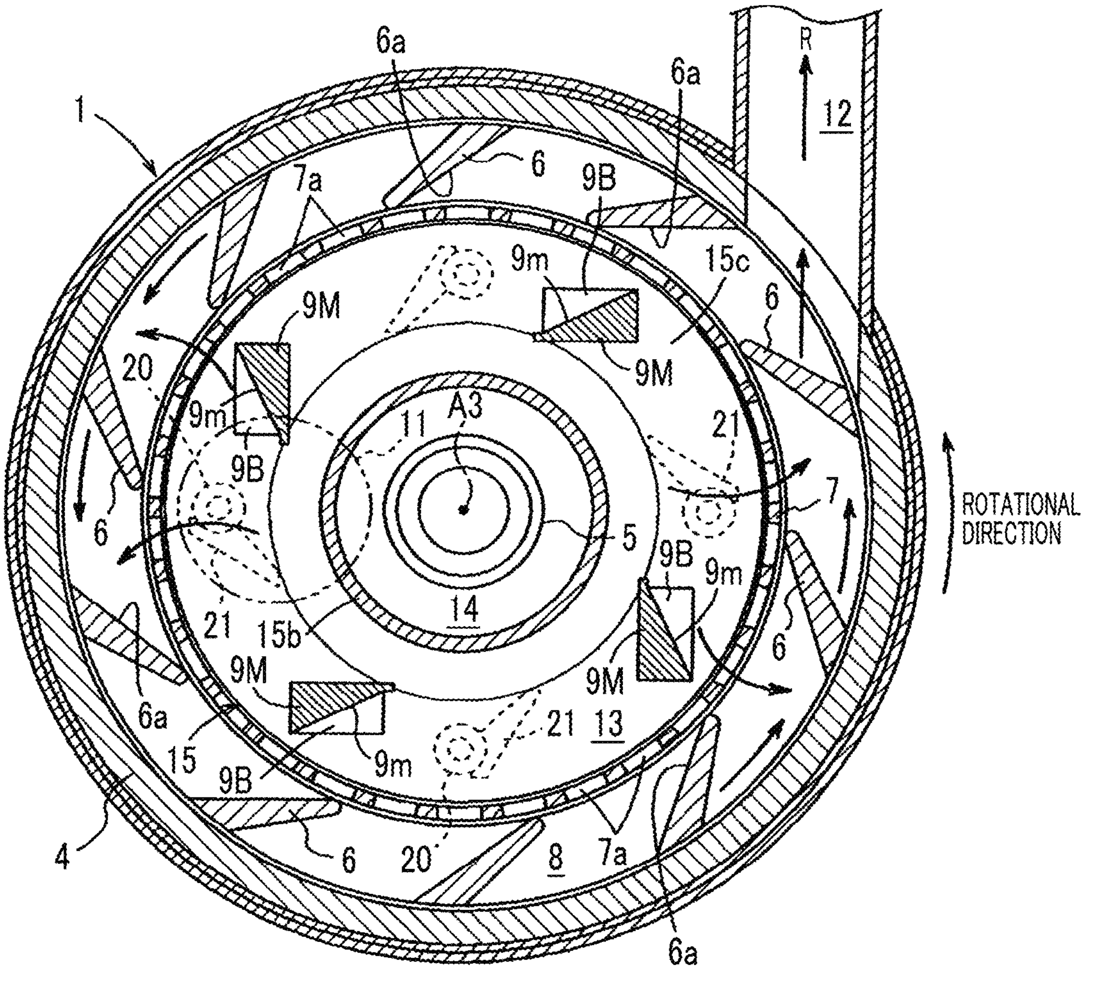
FIG. 3 is a sectional view as seen in direction V-V of FIG. 2.

As illustrated in FIG. 3, a plurality of rotary blades 6 are provided integrally with the rotor 5 on a radial outer side of the rotor 5 in a state where the rotary blades protrude to a front side (the left side of FIG. 2) that is the front wall part 2 side and are lined up at equal intervals in a circumferential direction.

A plurality of through-holes 7*a* and 7*b* used as throttle flow passages are respectively provided side by side in the circumferential direction in the cylindrical stator 7, the stator 7 is located on the front side (the left side of FIG. 2) of the rotor 5 and on a radial inner side of the rotary blades 6 and is fixed to and disposed at the front wall part 2, and an annular blade chamber 8, which serves also as a discharge chamber and which the rotary blades 6 go around, is formed between the stator 7 and the outer peripheral wall part 4 of the casing 1.

Figure 4:
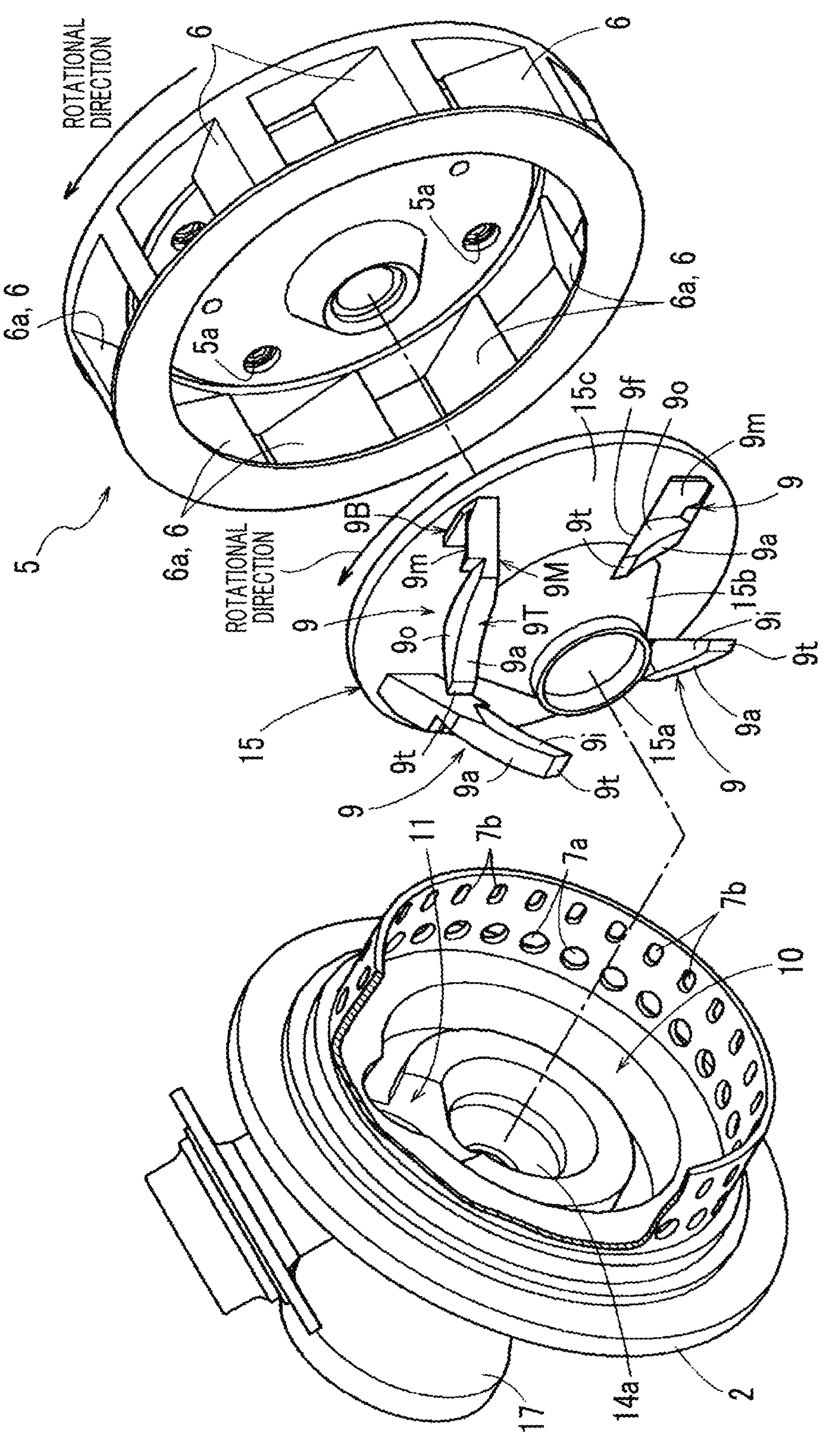
FIG. 4 is an exploded perspective view illustrating the internal structure of the suction stirring pump.

As illustrated in FIGS. 2 to 4, a first supply unit 11, which suctions and introduces arbitrary substances into the casing 1 by the rotation of the rotary blades 6, is provided at a position deviated further to an outer peripheral side than a central axis (axial center A3 of the casing 1) of the front wall part 2. However, in the present embodiment, the first supply unit 11 is closed to operate the suction stirring pump Y.

Figure 6:
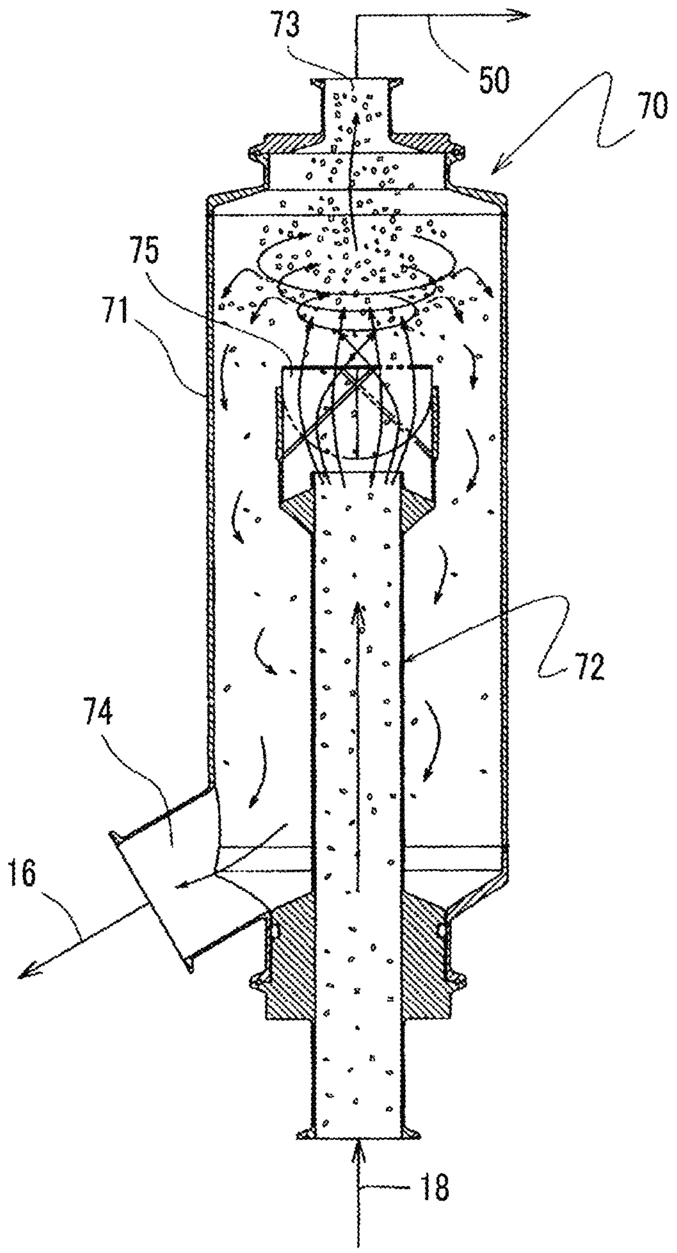
FIG. 6 is an explanatory view illustrating an internal structure of a separation unit of a recirculation mechanism unit.

As illustrated in FIGS. 1, 2, and 6, in this embodiment, the liquid R discharged from a discharge part 12 is supplied to the recirculation mechanism unit 70 through a discharge passage 18, and a second supply unit 17, which circulates and supplies the liquid R (air bubbles are separated in the cylindrical container 71 serving as a separation unit of the recirculation mechanism unit 70 from the liquid R) into the casing 1 via a circulation flow passage 16, is provided at a central part (concentrically with the axial center A3) of the front wall part 2 of the casing 1.

Additionally, as illustrated in FIGS. 2 to 4, a partition plate 15, which partitions an inner peripheral side of the stator 7 into a first introduction chamber 13 on the front wall part 2 side and a second introduction chamber 14 on the rotor 5 side, is provided on the front side of the rotor 5 in a state where the partition plate rotates integrally with the rotor 5, and a scraping blade 9 is provided on the front wall part 2 side of the partition plate 15. A plurality of (four in FIG. 4) the scraping blades 9 are concentrically provided at equal intervals in the circumferential direction, and each scraping blade 9 is disposed so as to be capable of going around integrally with the rotor 5 in a state where a tip part 9T has entered an annular groove 10.

The first introduction chamber 13 and the second introduction chamber 14 are configured so as to communicate with the blade chamber 8 via the plurality of through-holes 7*a* and 7*b* of the stator 7, the first supply unit 11 is configured so as to communicate with the first introduction chamber 13, and the second supply unit 17 is configured so as to communicate with the second introduction chamber 14.

Specifically, the first introduction chamber 13 and the blade chamber 8 communicate with each other through the plurality of through-holes 7*a* on the first introduction chamber 13 which are disposed at equal intervals in the circumferential direction in the portion of the stator 7 which faces the first introduction chamber 13, and the second introduction chamber 14 and the blade chamber 8 communicate with each other through the plurality of through-holes 7*b* on the second introduction chamber 14 which are disposed at equal intervals in the circumferential direction in the portion of the stator 7 which faces the second introduction chamber 14.

The respective parts of the suction stirring pump Y will be described.

As illustrated in FIG. 2, the rotor 5 is configured in such a shape that a front surface thereof swells in a substantially truncated conical shape, and the plurality of rotary blades 6 are provided side by side at equal intervals on an outer peripheral side of the rotor in a state where the rotary blades protrude forward. In addition, in FIG. 3, ten rotary blades 6 are disposed at equal intervals in the circumferential direction.

Additionally, each of the rotary blades 6 is formed to protrude from the outer peripheral side of the rotor 5 to an inner peripheral side thereof so as to be inclined backward in a rotational direction from an inner peripheral side of the rotary blade toward an outer peripheral side thereof, and the internal diameter of the tip part of the rotary blade 6 is made to be slightly larger than the external diameter of the stator 7.

The rotor 5 is coupled to a driving shaft 19 of the pump drive motor M inserted into the casing 1 through the rear wall part 3 and is rotationally driven by the pump drive motor M, in a state where the rotor is located concentrically with the casing 1 within the casing 1.

Then, the rotor 5 is configured such that cavitation (local boiling) occurs on a surface (back surface) 6*a* of the rotary blade 6 which is on a backward side in the rotational direction as the rotor is rotationally driven in a direction in which the tip part of the rotary blade 6 is located on the front side as seen in the axial center direction (as seen in direction V-V of FIG. 2 as illustrated in FIG. 3).

As illustrated in FIGS. 2, 4, and 5, the partition plate 15 is configured in a substantially funnel shape having a slightly smaller external diameter than the internal diameter of the stator 7. Specifically, the funnel shape partition plate 15 is configured in a shape including a funnel-shaped part 15*b*, which opens to a cylindrical sliding-contact part 15*a* in which a top part protrudes in a cylindrical shape, at a central part thereof, and including an annular flat plate part 15*c* in a state where both of a front surface and a rear surface are orthogonal to the axial center A3 of the casing 1, at an outer peripheral part of the funnel-shaped part 15*b*.

As illustrated in FIGS. 2 and 3, the partition plate 15 is attached to an attachment part 5*a* of the front surface of the rotor 5 via spacing holding members 20 that are disposed in a plurality of places (four places in this embodiment) spaced apart at regular intervals in the circumferential direction in a state where the cylindrical sliding-contact part 15*a* of the top part thereof faces the front wall part 2 side of the casing 1.

Figure 5A:
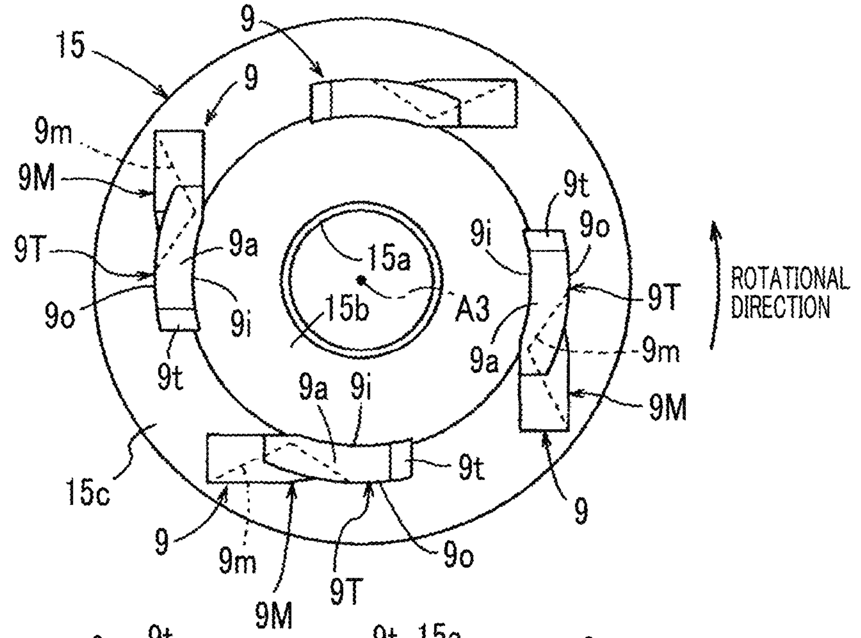
FIGS. 5A, 5B, and 5C are schematic block diagrams of a partition plate.
Figure 5B:
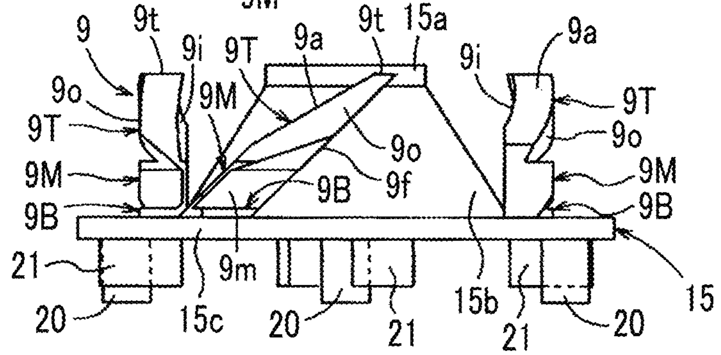
Figure 5C:
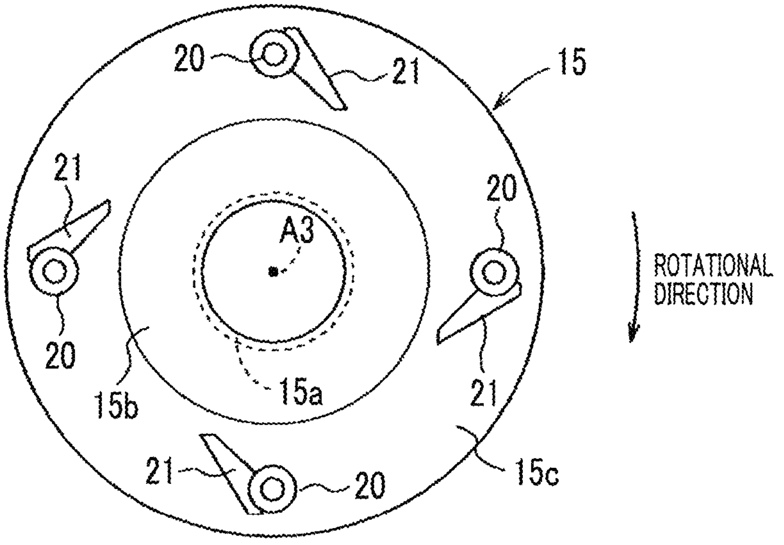

As illustrated in FIGS. 3 and 5C, when the partition plate 15 is attached to the rotor 5 via the spacing holding members 20 in a plurality of places, stirring blades 21 are integrally assembled to the partition plate 15 in a posture in which the stirring blades faces the rear wall part 3 side of the casing 1, and if the rotor 5 is rotationally driven, four stirring blades 21 are configured so as to rotate integrally with the rotor 5.

As illustrated in FIGS. 2 and 4, in this embodiment, the cylindrical second supply unit 17 is provided at a central part of the front wall part 2 of the casing 1 concentrically with the casing 1. A throttle part 14*a*, which has a smaller diameter than the internal diameter of the circulation flow passage 16 and has a smaller diameter than that of the cylindrical sliding-contact part 15*a* of the partition plate 15, and consequently has a smaller flow passage area, is formed at the second supply unit 17. As the rotary blade 6 of the rotor 5 rotates, the liquid R is discharged via the discharge part 12 and the liquid R is introduced via the throttle part 14*a* of the second supply unit 17. Thus, the inside of the suction stirring pump Y is decompressed.

As illustrated in FIGS. 2 and 4, the stator 7 is attached to an inner surface (the surface of the front wall part 2 of the casing 1 which faces the rotor 5) and is fixed so that the front wall part 2 of the casing 1 and the stator 7 become integral with each other. In the stator 7, the plurality of through-holes 7*a* on the first introduction chamber 13 side disposed in a portion that faces the first introduction chamber 13 are formed in a substantially circular shape, and the total flow passage area of the plurality of through-holes 7*a* on the first introduction chamber 13 side is set so as to become smaller rather than the flow passage area of the first introduction chamber 13. Additionally, the plurality of through-holes 7*b* on the second introduction chamber 14 side disposed in a portion that faces the second introduction chamber 14 is formed in a substantially elliptical shape, and the total flow passage area of the plurality of through-holes 7*b* on the second introduction chamber 14 side is set so as to become small rather than the flow passage area of the second introduction chamber 14. As the rotary blade 6 of the rotor 5 rotates, the liquid R is discharged via the discharge part 12 and the liquid R is introduced via the second supply unit 17. Thus, the inside of the suction stirring pump Y is decompressed.

As illustrated in FIGS. 4 and 5, in this embodiment, each scraping blade 9 is formed in a rod shape and is fixed such that a base end part 9B of the rod-shaped scraping blade 9 rotates integrally with the rotor 5 in an inclined posture in which the scraping blade 9 is located closer to the front wall part 2 side on a tip side of the rod-shaped scraping blade 9 as seen in a diameter direction (as seen in a front-back direction of the sheet of FIG. 5B) of the rotor 5 and is located closer to an radial inner side of the rotor 5 on the tip side of the rod-shaped scraping blade 9 as seen in the axial center direction (as seen in the front-back direction of the sheet of FIG. 5A) of the rotor 5, and the rotor 5 is rotationally driven in a direction (a direction indicated by an arrow in FIGS. 2 to 5) in which a tip of the scraping blade 9 is located on the front side as seen in the axial center direction (as seen in the front-back direction of the sheet of FIG. 5A) of the rotor 5.

Each scraping blade 9 will be described with reference to FIGS. 3 to 5.

The scraping blade 9 is configured in a rod shape including the base end part 9B fixed to the partition plate 15, an intermediate part 9M brought into the state of being exposed to the first introduction chamber 13, and the tip part 9 brought into the state of being fitted (that is, entering) into the annular groove 10 in series from a base end toward a tip.

As illustrated in FIGS. 3, 4, and 5B, the base end part 9B of the scraping blade 9 is configured in a substantially rectangular plate shape.

As illustrated in FIG. 3, FIG. 4, and FIGS. 5A and 5B, the intermediate part 9M of the scraping blade 9 is configured in a substantially triangular columnar shape such that the cross-sectional shape thereof becomes a substantially triangular shape (particularly refer to FIG. 3). As the scraping blade 9 is provided in the inclined posture as described above, one side surface 9*m* (hereinafter may be referred to as a “radiation surface”), which faces a forward side in the rotational direction of the rotor 5 among three side surfaces of the triangular columnar intermediate part 9M, is configured to face (hereinafter may be referred to as “inclinedly outward”) the radial outer side with respect to the radial direction of the rotor 5 in the front part low state of being inclined toward the forward side in the rotational direction of the rotor 5 (particularly refer to FIGS. 4 and 5).

That is, as the rod-shaped scraping blade 9 is provided in the inclined posture as described above, the intermediate part 9M of the scraping blade 9, which is exposed to the first introduction chamber 13, is located closer to the radial outer side of the rotor 5 than the tip part 9T fitted into the annular groove 10, and the radiation surface 9*m* of the intermediate part 9M, which faces the forward side in the rotational direction of the rotor 5, is inclined inclinedly outward with respect to the radial direction of the rotor 5 in the front part low state of being inclined toward the forward side in the rotational direction of the rotor 5.

As illustrated in FIG. 4, FIG. 5A, and FIG. 5B, the tip part 9T of the scrape blade 9 has a substantially square columnar shape of which the cross-sectional shape becomes a substantially rectangular shape, and is configured in a circular-arc shape in which, as seen in the axial center direction (as seen in the front-back direction of the sheet of FIG. 5A) of the rotor 5, an outward side surface 90 that faces the radial outer side of the rotor 5 among the four side surfaces runs along an inward inner surface that faces the radial inner side in the inner surface of the annular groove 10, and an inward side surface 9*i* that faces the radial inner side of the rotor 5 among the four side surfaces runs along an outward inner surface that faces the radial outer side in the inner surface of the annular groove 10.

Additionally, a scraping surface 9*f*, which faces the forward side in the rotational direction of the rotor 5 among the four side surfaces of the square columnar tip part 9T, is configured to face (hereinafter may be referred to as “inclinedly outward”) the radial outer side with respect to the radial direction of the rotor 5 in the front part low state of being inclined toward the forward side in the rotational direction of the rotor 5.

Moreover, a tip surface 9*t* of the tip part 9T of the scraping blade 9 is configured so as to become parallel to a bottom surface of the annular groove 10 in a state where the tip part 9T is fitted into the annular groove 10.

Additionally, if the rotor 5 is rotationally driven in a direction in which the tip of the scraping blade 9 is located on the front side as seen in the axial center direction (as seen in the front-back direction of the sheet of FIG. 5A), a surface (back surface) 9*a* which is on the backward side in the rotational direction is formed in each of the base end part 9B, the intermediate part 9M, and the tip part 9T of the scraping blade 9. The back surface 9*a* is configured such that cavitation (local boiling) occurs therein as the scraping blade 9 rotates.

The four scraping blades 9 configured in the shape as described above are provided such that the base end part 9B of each scrape blade is fixed to the annular flat plate part 15*c* of the partition plate 15 in the form in which the scraping blades are lined in the circumferential direction at intervals of 90 degrees at a central angle, in the inclined posture as described above.

As illustrated in FIG. 2, the partition plate 15 provided with the scraping blades 9 is attached to the attachment part 5*a* of the front surface of the rotor 5 in the state of being spaced apart from the front surface of the rotor 5 by the spacing holding member 20, and the rotor 5 is disposed within the casing 1 in a state where the cylindrical sliding-contact part 15*a* of the partition plate 15 is fitted into the second supply unit 17 in a slidingly rotatable state.

Accordingly, the tapered second introduction chamber 14 having a smaller diameter on the front wall part 2 side of the casing 1 is formed between the swelling front surface of the rotor 5 and a rear surface of the partition plate 15, and the second supply unit 17 is configured so as to communicate with the second introduction chamber 14 via the cylindrical sliding-contact part 15*a* of the partition plate 15.

Additionally, the annular first introduction chamber 13 that communicates with the first supply unit 11 is formed between the front wall part 2 of the casing 1 and the front surface of the partition plate 15.

Then, if the rotor 5 is rotationally driven, the partition plate 15 rotates integrally with the rotor 5 in a state where the cylindrical sliding-contact part 15*a* comes into sliding contact with the second supply unit 17. As a result, even in a state the rotor 5 and the partition plate 15 rotate, a state where the second supply unit 17 communicates with the second introduction chamber 14 via the cylindrical sliding-contact part 15*a* of the partition plate 15 is maintained.

[Recirculation Mechanism Unit]

The recirculation mechanism unit (an example of a separation unit) 70 is configured so as to separate the air bubbles included in the liquid R within the cylindrical container 71.

Then, as illustrated in FIG. 1, the air bubbles are separated from the liquid R supplied through the discharge passage 18 from the discharge part 12 of the suction stirring pump Y, the liquid R from which the air bubbles are separated are supplied to the circulation flow passage 16, and the air bubbles (gas G) are released to the outside via a gas release pipe 50.

Here, the discharge passage 18 and the circulation flow passage 16 are respectively connected to a lower part of the cylindrical container 71, and the gas release pipe 50 is connected to an upper part of the cylindrical container 71.

Here, as illustrated in FIG. 6, the recirculation mechanism unit 70 is configured such that an introduction pipe 72 to which the discharge passage 18 is connected is disposed to protrude from a bottom surface of the cylindrical container 71 to the inside thereof, the gas release pipe 50 is provided at the upper part of the cylindrical container 71, a circulation unit 74 connected to the circulation flow passage 16 is provided at the lower part of the cylindrical container, and a twist plate 75 for swirling the flow of the liquid R discharged from the introduction pipe 72 is disposed at a discharge upper end of the introduction pipe 72. Accordingly, the liquid R including no air bubbles is supplied into the second introduction chamber 14 via the circulation flow passage 16.

[Control Unit]

Although a control unit provided in the nanoparticle synthesis apparatus 100 is not illustrated, the control unit consists of a well-known arithmetic processing unit including a CPU, a storage unit, and the like, and is configured so as to be capable of controlling the operation of respective devices, such as the liquid supply unit X and the suction stirring pump Y, which constitute the nanoparticle synthesis apparatus 100.

Particularly the control unit is configured so as to be capable of controlling the circumferential speed (the rotational speed of the rotor 5) of the rotary blade 6, sets the circumferential speed (the rotational speed of the rotor 5) of the rotary blade 6 such that the pressure within the first introduction chamber 13 and the second introduction chamber 14 is brought into a predetermined negative pressure state, and is configured to rotate the rotary blade 6 at the set circumferential speed (the rotational speed of the rotor 5) so that at least a region within the blade chamber 8 immediately after having passed through the through-holes 7*a* of the stator 7 on the first introduction chamber 13 side and the through-holes 7*b* of the stator on the second introduction chamber 14 side can be formed over the entire circumference within the blade chamber 8 as a fine air-bubble region (the air-bubble generation region caused by cavitation (local boiling)) where a number of fine air bubbles (microbubbles) of the liquid R are generated.

Here, a pressure gauge 80 is provided to measure the pressure (in the present embodiment, the pressure within the first introduction chamber 13 (here, the first introduction chamber 13 and the first second introduction chamber 14 have substantially the same pressure)) within the first introduction chamber 13 and the second introduction chamber 14.

[In-Liquid Plasma Generation Mechanism]

The plasma generation mechanism Z is disposed on the discharge passage 18 that is connected to the discharge part 12 of the suction stirring pump Y and through which the liquid R passes.

As illustrated in FIG. 1B, the plasma generation mechanism Z is constituted of electrodes 81 that are installed within the discharge passage 18 where the discharge part 12 of the suction stirring pump Y and the recirculation mechanism unit 70 are connected together and that is made of metals, such as platinum, the tungsten, gold, silver, and copper, or metal oxides, which are nanoparticle materials to be synthesized, and a power source 82 for applying a pulse voltage between the electrodes 81.

The plasma generation mechanism Z disassociates (plasmizates) a vaporized material due to high-voltage insulation breakdown discharge caused by a pulse voltage in an insulating air-bubble region, thereby generating in-liquid plasma.

In this case, it is preferable that the form of discharge caused by the pulse voltage is glow discharge in which the electrodes 81 are installed to face a direction orthogonal to the discharge passage 18 through which the liquid R passes. Accordingly, the in-liquid plasma can be generated at a low temperature.

[Operation of Nanoparticle Synthesis Apparatus]

Next, the operation of the nanoparticle synthesis apparatus 100 will be described.

First, for example, the liquid R, such as water, is stored in the cylindrical container 71 serving as a storage tank of the liquid supply unit X that serves also as the recirculation mechanism unit 70.

In this state, if the operation of the suction stirring pump Y is started, the inside of the suction stirring pump Y being brought into a negative pressure state. As a result, the liquid R stored in the cylindrical container 71 is supplied to the second supply unit 17 via the circulation flow passage 16 by being suctioned under a negative pressure.

The liquid R supplied to the second supply unit 17 is introduced into the second introduction chamber 14 in a state where the flow rate thereof is limited via the throttle part 14*a* of the second supply unit 17. Within the second introduction chamber 14, the liquid receives a shearing action by the plurality of stirring blades 21 that are being rotated and receives a shearing action in the case of the passage through the through-holes 7*b* on the second introduction chamber 14 side. In this case, the liquid R is introduced into the blade chamber 8 in a state where the flow rate thereof is limited via the through-holes 7*b* on the second introduction chamber 14 side. Then, after the liquid receives a shearing action by the rotary blade 6 that rotates at a high speed within the blade chamber 8, the liquid R is discharged from the discharge part 12.

Here, the control unit is configured so as to be capable of controlling the circumferential speed (the rotational speed of the rotor 5) of the rotary blade 6, sets the circumferential speed (the rotational speed of the rotor 5) of the rotary blade 6 such that the pressure within the first introduction chamber 13 and the second introduction chamber 14 is brought into a predetermined negative pressure state, and rotates the rotary blade 6 at the set circumferential speed (the rotational speed of the rotor 5) so that at least a region within the blade chamber 8 immediately after having passed through the through-holes 7*a* of the stator 7 on the first introduction chamber 13 side and the through-holes 7*b* of the stator on the second introduction chamber 14 side can be formed over the entire circumference within the blade chamber 8 as a fine air-bubble region (the air-bubble generation region caused by cavitation (local boiling)) where a number of fine air bubbles (microbubbles) of the liquid R are generated.

In this case, when the suction stirring pump Y is being operated, the circumferential speed of the rotary blade 6 of the suction stirring pump Y is set to 6 to 80 m/s and preferably 15 to 50 m/s such that the pressures within the first introduction chamber 13 and the second introduction chamber 14 are brought into a negative pressure state in a range of −0.01 to −0.10 MPa, preferably −0.03 to −0.09 MPa, and more preferably −0.04 to −0.08 MPa.

Here, the negative-pressure state means the pressures within the first introduction chamber 13 and the second introduction chamber 14 that are measured by the pressure gauge 80.

Meanwhile, in the nanoparticle synthesis apparatus 100, the plasma generation mechanism Z is disposed on the discharge passage 18 that is connected to the discharge part 12 of the suction stirring pump Y and through which the liquid R is supplied and passes.

Then, a pulse voltage is applied between the electrodes 81 by the power source 82 of the plasma generation mechanism Z.

Accordingly, plasma is generated in the air bubbles generated in the liquid R by cavitation. In that case, as the electrodes in which the elements constituting the nanoparticles to be synthesized are contained are consumed, the nanoparticles can be simply synthesized with high energy efficiency.

Here, the nanoparticles to be synthesized are constituted of the elements (metals) and/or oxides (metal oxides) of the elements, which are contained in the electrodes.

It is preferable that the form of discharge caused by the pulse voltage is glow discharge, the nanoparticles can be synthesized at a low temperature with high energy efficiency. Specifically, the liquid can be treated at normal temperature (liquid temperature of 10 to 25° C.) by operating cooling means (not illustrated) provided in the nanoparticle synthesis apparatus 100, for example, jacket cooling means provided in the suction stirring pump Y.

The liquid R containing the synthesized nanoparticles, which are discharged from the discharge part 12, is supplied to the recirculation mechanism unit 70 through the discharge passage 18, and the liquid R from which air bubbles are separated in the cylindrical container 71 serving as the separation unit of the recirculation mechanism unit 70 is supplied and circulated by being suctioned into the second supply unit 17 via the circulation flow passage 16 under a negative pressure while the suction stirring pump Y is operated.

In this way, although the liquid R containing the synthesized nanoparticles is stored in the cylindrical container 71, the liquid is taken out by removing the circulation flow passage 16, or is supplied to the subsequent process via a discharge passage (not illustrated) that is separately formed.

EXAMPLES

Next, the tests of synthesizing nanoparticles performed using the nanoparticle synthesis apparatus 100 will be described.

[Test Conditions]

Electrode: platinum (Pt), tungsten (W), and golden (Au)

Rotational speed of pump drive motor M that rotationally drives rotor 5 of suction stirring pump Y of nanoparticle synthesis apparatus 100: 7200 rpm Liquid R: ion-exchanged water 1L Jacket cooling means provided in the suction stirring pump Y of nanoparticle synthesis apparatus 100: 5 degrees and 1400 L/h Other test conditions As described in Tables 1 to 3

TABLE 1

| Test | (1) | (2) | (3) |
|---|---|---|---|
| Voltage V) | 200 | 150 | 100 |
| Pulse (μs) | 1.5 | 1.5 | 0.5 |
| Gap (mm) | 1.0 | 1.0 | 1.0 |
| JPSS (rpm) | 7200 | 7200 | 7200 |
| Power source (A) | 7 | 4.6 | 2.5 |
| Decompression degree (Mpa) | −0.085 | −0.085 | −0.088 |
| Reaction Time (min) | 5 | 5 | 5 |
| Temperature (° C.) | — | — | — |
| Nanoparticle concentration (%) | 0.033 | 0.016 | 0.002 |
| D50 (nm) | 66.5 | 38.2 | 132.4 |

TABLE 2

| Test | (4) | (5) | (6) | (7) | (8) |
|---|---|---|---|---|---|
| Voltage V) | 200 | 150 | 100 | 200 | 200 |
| Pulse (μs) | 1.5 | 1.5 | 1.5 | 1.5 | 1.5 |
| Gap (mm) | 1.0 | 1.0 | 1.0 | 0.1 | 1.0 |
| JPSS (rpm) | 7200 | 7200 | 7200 | 6000 | 4800 |
| Power source (A) | 6.5 | 4.9 | 3.2 | 5.9 | 5.4 |
| Decompression degree (Mpa) | −0.083 | −0.083 | −0.086 | −0.057 | −0.018 |
| Reaction Time (min) | 5 | 5 | 5 | 5 | 6 |
| Temperature (° C.) | 18.6 | — | — | — | — |
| Nanoparticle concentration (%) | 0.012 | 0.007 | 0.002 | 0.008 | 0.011 |
| D50 (nm) | 119.1 | 116.8 | 70.9 | 117.7 | 122.3 |

TABLE 3

| Test | | | (9) | (10) | (11) |
|---|---|---|---|---|---|
| Voltage V) | — | — | 200 | 200 | 150 |
| Pulse (μs) | — | — | 1.5 | 1.5 | 1.5 |
| Gap (mm) | — | — | 1.0 | 1.0 | 1.0 |
| KHz | — | — | 60 | 60 | 60 |
| Power source (A) | — | — | — | 6.5~7.0 | — |
| JPSS (rpm) | — | — | 7200 | 7200 | 7200 |
| Reaction Time (min) | — | — | 1 | 5 | 5 |
| Temperature (° C.) | — | — | 66.3 | 20.6 | 21.2 |
| W weight (g) | Left | 0.751 | 0.739 | 0.727 | 0.720→0.713 |
| | Right | 0.758 | 0.746 | 0.735 | 0.735→0.725 |
| Concentration (ppm) | — | — | 24 | 23 | 12 |
| D50 (nm) | — | — | 23.4 | 1.1 | 1.4 |

Figure 8:
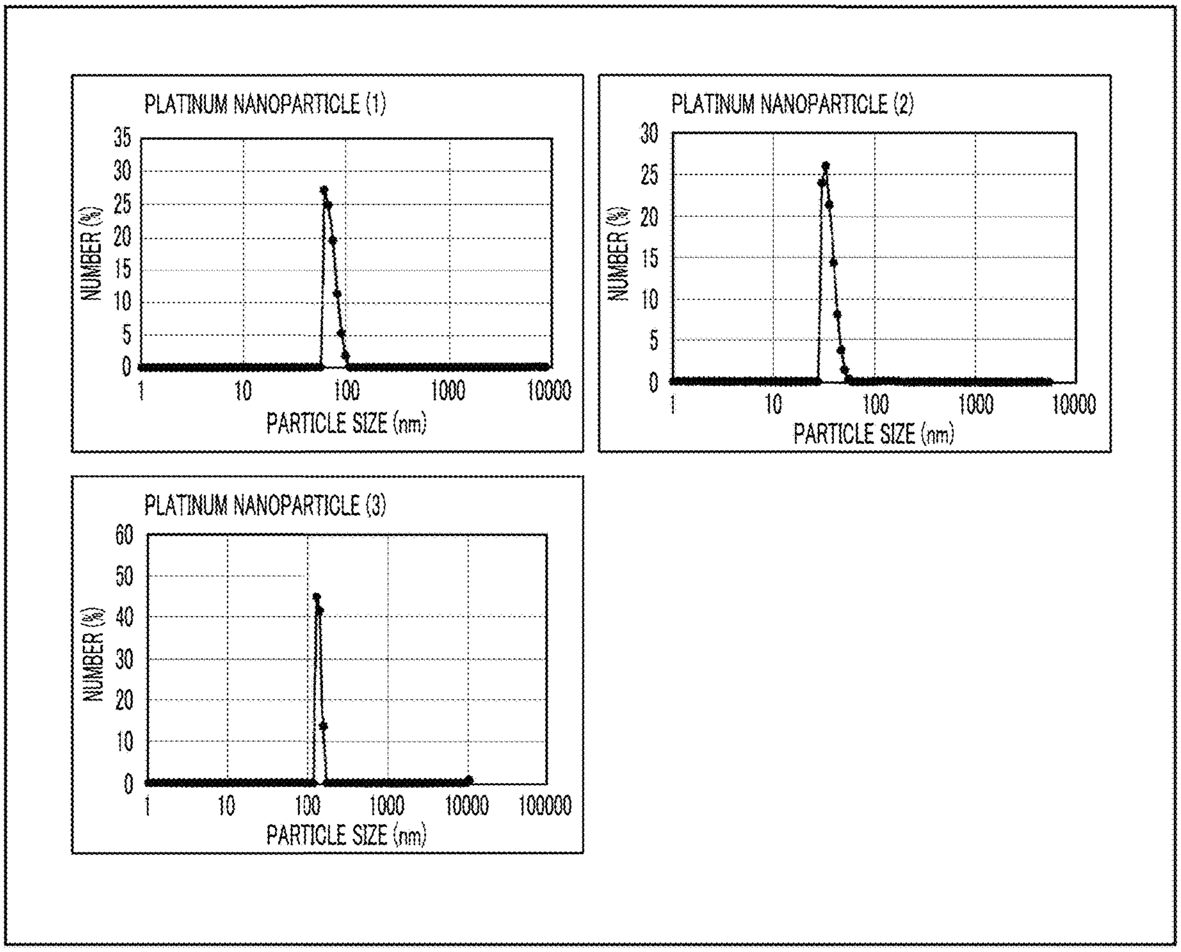
FIG. 8 is graphs illustrating relationships between the particle diameter and the number of platinum nanoparticles that are synthesized using the nanoparticle synthesis apparatus of the embodiment of invention.
Figure 9:
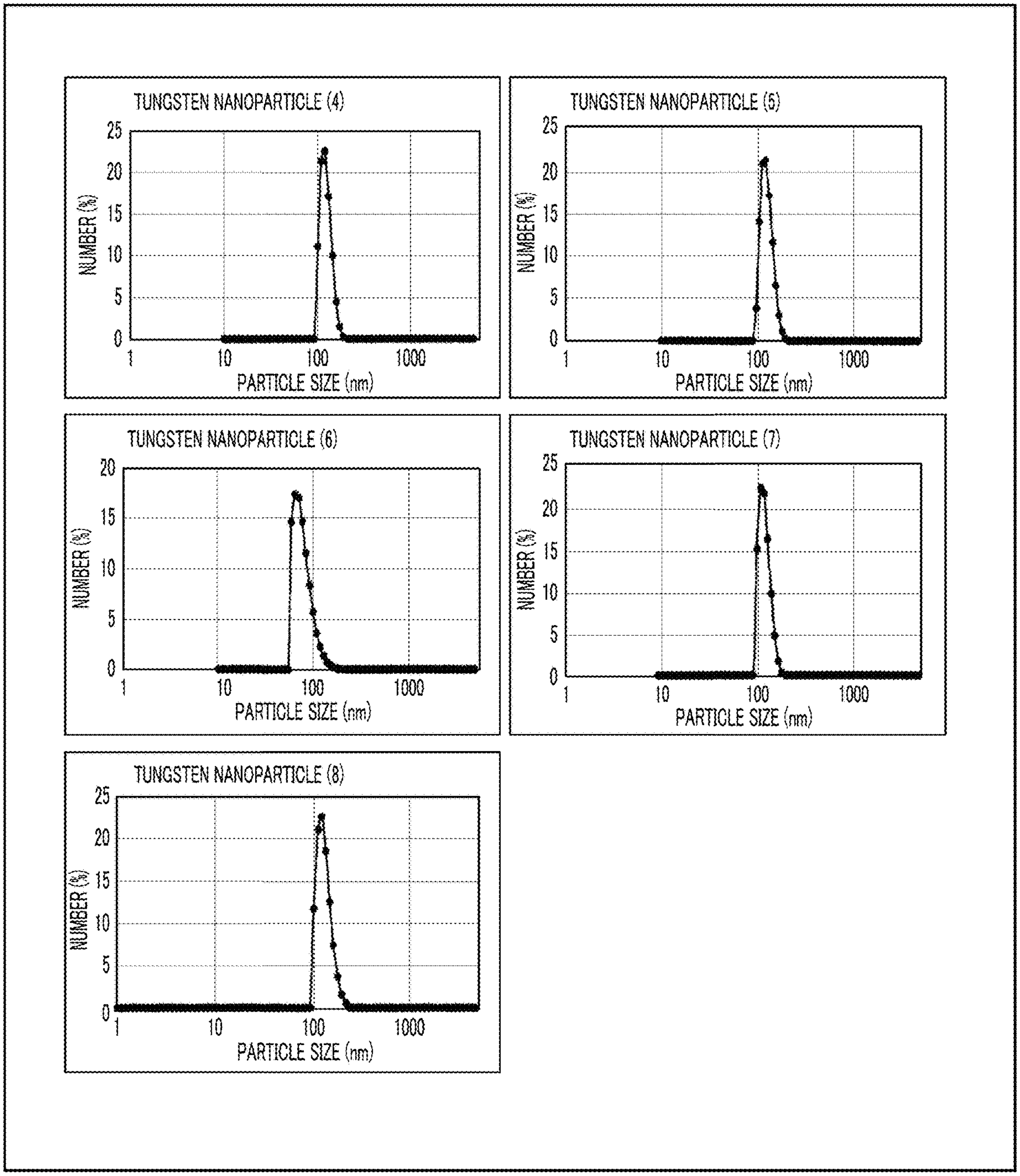
FIG. 9 is graphs illustrating relationships between the particle diameter and the number of tungsten nanoparticles that are synthesized using the nanoparticle synthesis apparatus of the embodiment of the invention.
Figure 10:
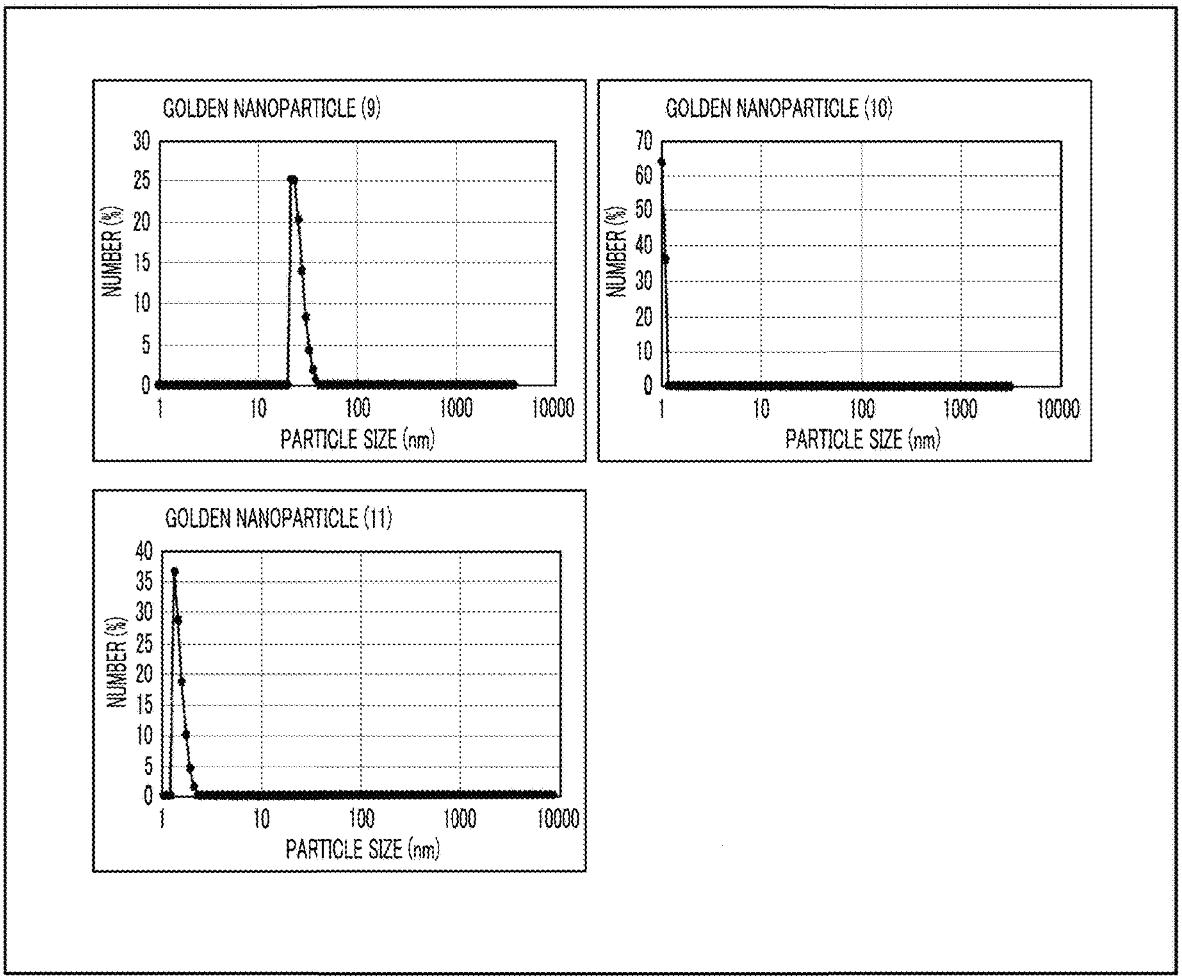
FIG. 10 is graphs illustrating relationships between the particle diameter and the number of platinum nanoparticles that are synthesized using the nanoparticle synthesis apparatus of the embodiment of the invention.

The results of the above tests of synthesizing the nanoparticles are illustrated in Tables 1 to 3 and FIGS. 8 to 10.

As is also clear from the results, it can be confirmed that nanoparticles of 200 nm or less, particularly about several tens of nanometers to 100 nanometers can be simply synthesized with high energy efficiency particularly regarding platinum, tungsten, and gold, and characteristic values, such as the concentration and the average particle diameter (D50) of the nanoparticles to be synthesized, are changed by adjusting the voltage, the pulse (cycle), and the like to be applied to the electrodes.

Meanwhile, in the above embodiment, cavitation (local boiling) occurs as the scraping blade 9 rotates, or and the region within the blade chamber 8 immediately after having passed through the through-holes 7*a* of the stator 7 on the first introduction chamber 13 side and the through-holes 7*b* of the stator on the second introduction chamber 14 side is formed as the fine air-bubble region (the air-bubble generation region caused by cavitation (local boiling)) where a number of fine air bubbles (microbubbles) of the liquid R are generated. Accordingly, the plasma is generated by the plasma generation mechanism in the air bubbles generated in the liquid R. In that case, when the electrodes in which the elements constituting the nanoparticles to be synthesized are contained are consumed, the nanoparticles are synthesized. However, by installing an obstacle in the flow passage for the liquid R having a flow speed applied thereto in addition to these (or instead of these), the cavitation (local boiling) is caused in the liquid R behind this obstacle, and thus, the plasma is by the plasma generation mechanism Z in the air bubbles generated in the liquid R. In that case, as the electrodes in which the elements constituting the nanoparticles to be synthesized are contained are consumed, the nanoparticles can be synthesized.

Figure 7A:
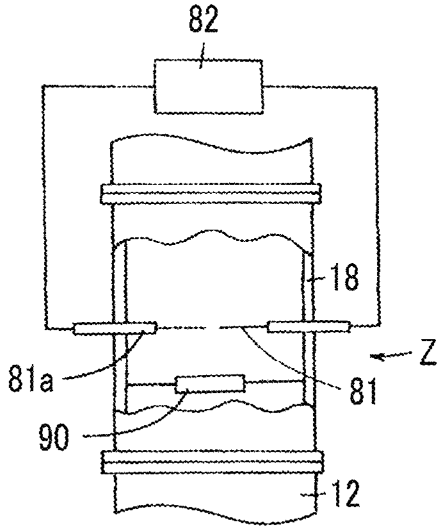
FIGS. 7A and 7B illustrate the embodiment of the nanoparticle synthesis apparatus of the invention and are explanatory views illustrating an obstacle that causes cavitation in a liquid having a flow speed applied thereto and the plasma generation mechanism.
Figure 7B:
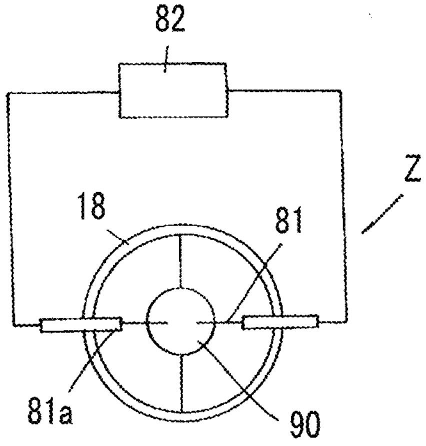

Specifically, as illustrated in FIG. 1B, the obstacle can be constituted of the electrodes 81 (including the supporting members 81*a* of the electrodes 81) of the plasma generation mechanism Z installed in the discharge passage 18 that is the flow passage for the liquid R having a flow speed applied thereto and through which the liquid R passes, or as illustrated in FIG. 7, can be constituted of an obstacle 90 (as the obstacle 90, in the present embodiment, a disk-shaped object is installed in the discharge passage 18 through which the liquid R passes. However, the shape of the obstacle 90 is not particularly limited. For example, objects of arbitrary shapes, such as a rod shape, can be installed) installed on an upstream side of the electrodes 81 of the plasma generation mechanism Z.

Accordingly, fine air bubbles caused by cavitation can be efficiently generated in the liquid R by a simple mechanism.

In this way, the cavitation is caused in the liquid R by installing the electrodes 81 (including the supporting members 81*a* of the electrodes 81) or the obstacle 90 of the plasma generation mechanism Z installed in the flow passage for the liquid having a flow speed applied thereto, and thus, the plasma is generated by the plasma generation mechanism Z in the air bubbles generated in the liquid R. In that case, as the electrodes in which the elements constituting the nanoparticles to be synthesized are contained are consumed, the nanoparticles can be synthesized.

In addition, in the present embodiment, the flow speed is applied to the liquid R by the suction stirring pump Y. However, a flow speed application mechanism that applies the flow speed to the liquid R is not limited to this, and a water flow generation mechanism can be used for general-purpose pumps or the like.

Although the nanoparticle synthesis apparatus of the embodiment of the invention has been described above on the basis of the embodiment, the invention is not limited to the contents described in the above embodiment, and the configuration thereof can also be appropriately changed without departing from the scope thereof.

Since the nanoparticle synthesis apparatus of the embodiment of the invention can simply synthesize the nanoparticles with excellent energy efficiency, this nanoparticle synthesis apparatus can be suitably used in order to synthesize nanoparticles of metals or metal oxides that are used in various technical fields, such as catalysts, electronics, and chemistry.

It should be understood that the invention is not limited to the above-described embodiment, but may be modified into various forms on the basis of the spirit of the invention. Additionally, the modifications are included in the scope of the invention.

What is claimed is:

1. A nanoparticle synthesis apparatus comprising:

a recirculation mechanism unit comprising:

a gas release pipe configured to discharge a gas from the recirculation mechanism unit;

a suction stirring pump comprising:

a rotary blade configured to suction a liquid into the suction stirring pump and generate cavitation bubbles in the liquid by cavitation, a casing configured to encase the rotary blade; and a plasma generation mechanism connected between the recirculation mechanism unit and the casing, wherein the casing is connected between the recirculation mechanism unit and the plasma generation mechanism, wherein the suction stirring pump is configured to:

suction, from the recirculation mechanism unit by rotation of the rotary blade, the liquid into the suction stirring pump, and generate, in the suction stirring pump by the rotation of the rotary blade, cavitation that produces the cavitation bubbles in the liquid, wherein the plasma generation mechanism is configured to:

generate a plasma in the cavitation bubbles, receive, when the suction stirring pump causes the cavitation, the liquid from the suction stirring pump, generate, when the plasma generation mechanism receives the liquid from the suction stirring pump, the plasma in the cavitation bubbles, and supply, through the plasma generation mechanism when the plasma generation mechanism generates the plasma in the cavitation bubbles, the liquid to the recirculation mechanism unit, and wherein the recirculation mechanism unit is configured to:

separate, when the recirculation mechanism unit receives the liquid from the plasma generation mechanism, the cavitation bubbles from the liquid, discharge, via the gas release pipe when the recirculation mechanism unit separates the cavitation bubbles from the liquid, the gas in the cavitation bubbles from within the recirculation mechanism unit, and supply, when the when the recirculation mechanism unit separates the cavitation bubbles from the liquid, the liquid to the suction stirring pump.

2. The nanoparticle synthesis apparatus according to claim 1, wherein the plasma generation mechanism is located further on an upper side than the suction stirring pump.

3. The nanoparticle synthesis apparatus according to claim 1, wherein the rotation of the rotary blade causes a negative pressure that suctions the liquid into the suction stirring pump.

4. The nanoparticle synthesis apparatus according to claim 3, wherein the negative pressure is in a range of −0.01 to −0.10 MPa.

5. The nanoparticle synthesis apparatus according to claim 1, wherein the suction stirring pump is configured to cool the liquid.

6. The nanoparticle synthesis apparatus according to claim 1, wherein the suction stirring pump comprises a pressure gauge that is configured to measure a pressure in an introduction chamber of the suction stirring pump.

7. The nanoparticle synthesis apparatus according to claim 1, wherein the recirculation mechanism unit is connected to the suction stirring pump.

8. The nanoparticle synthesis apparatus according to claim 1, wherein the plasma generation mechanism is connected to the suction stirring pump and the recirculation mechanism unit.

9. The nanoparticle synthesis apparatus according to claim 1, wherein the recirculation mechanism unit comprises a tank that is configured to store the liquid.

10. The nanoparticle synthesis apparatus according to claim 1, further comprising:

a circulation flow passage configured to supply, into the suction stirring pump, the liquid in the recirculation mechanism unit.

11. The nanoparticle synthesis apparatus according to claim 10, wherein the circulation flow passage connects the suction stirring pump to the recirculation mechanism unit.

12. The nanoparticle synthesis apparatus according to claim 10, wherein the plasma generation mechanism comprises a discharge passage that connects the suction stirring pump to the recirculation mechanism unit.

13. The nanoparticle synthesis apparatus according to claim 12, wherein the plasma generation mechanism comprises an electrode that is configured to be consumed when the plasma generation mechanism generates the plasma in the cavitation bubbles.

14. The nanoparticle synthesis apparatus according to claim 1, wherein the nanoparticle synthesis apparatus is configured to synthesize nanoparticles.

* * * * *